Figure 4:
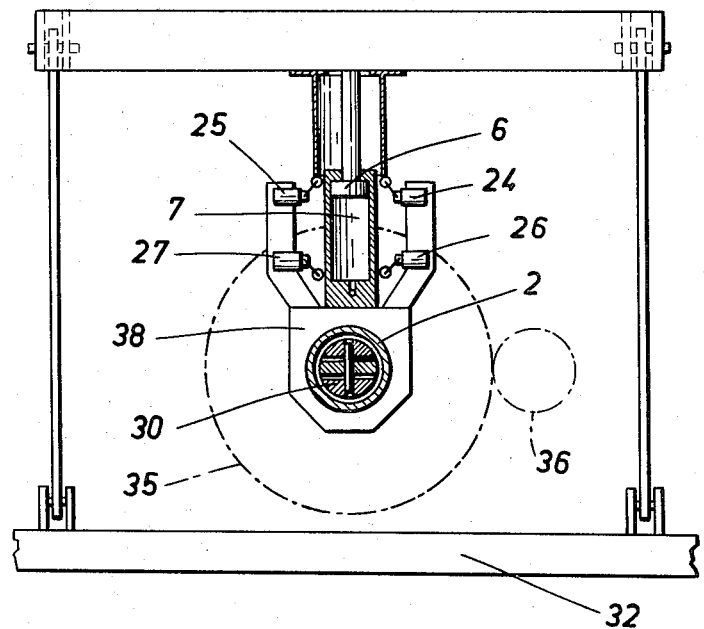

United States Patent [19]
Jabkowski

[11] 3,865,424
[45] Feb. 11, 1975

[54] HYDRAULICALLY OPERABLE TONGS FOR CHARGING A WORKPIECE TO BE FORGED

[75] Inventor: Fridolin Jabkowski, Linz, Austria

[73] Assignee: Vereinigte Osterreichische Eisen- und Stahlwerke Aktiengesellschaft, Linz, Austria

[22] Filed: Mar. 13, 1973

[21] Appl. No.: 340,714

[30] Foreign Application Priority Data
Apr. 6, 1972  Austria .............................. 2946/72

[52] U.S. Cl................ 294/88, 214/1 BB, 214/1 BD
[51] Int. Cl............................................... B23q 3/06
[58] Field of Search............ 294/86 R, 88, 103, 104, 294/106, 115; 214/1 CM, 1 B, 1 BB, 1 BC, 1 BD, 147 T; 269/25, 26, 27, 30, 31

[56] References Cited
UNITED STATES PATENTS

| | | | |
|---|---|---|---|
| 2,677,342 | 5/1954 | Miller ................................ | 294/88 X |
| 3,114,463 | 12/1963 | Fouron .............................. | 214/1 BD |
| 3,279,624 | 10/1966 | Devol ................................ | 214/1 BC |
| 3,628,674 | 12/1971 | Koike et al. ....................... | 214/1 BD |
| 3,732,989 | 5/1973 | Cagle................................. | 214/1 BD |

*Primary Examiner*—Evon C. Blunk
*Assistant Examiner*—Johnny D. Cherry
*Attorney, Agent, or Firm*—Kurt Kelman

[57] ABSTRACT

A jaw carrier is pivoted on a horizontal pivot. Jaw means are mounted on said jaw carrier and adapted to be closed to grip a workpiece and adapted to be opened to release said workpiece. A double-acting hydraulic jaw-closing actuator is connected to said jaw means and comprises a jaw-closing cylinder and a jaw-closing piston, which is movable in said jaw-closing cylinder and defines therein a jaw-closing pressure chamber for applying pressure to said jaw-closing piston in a jaw-closing sense, and a jaw-opening pressure chamber for applying pressure to said jaw-closing piston in a jaw-opening sense. Controlled pressure-applying means are provided, which serve to apply a predetermined pressure to said jaw-closing piston from said jaw-closing pressure chamber. A hydraulic tilting actuator is connected to said jaw carrier and comprises a tilting cylinder and a tilting piston, which is movable in said tilting cylinder and defines therein a tilting pressure chamber for applying pressure to said tilting piston so as to control the angular postion of said jaw carrier. A transfer conduit connects said tilting pressure chamber to said jaw-closing pressure chamber. Shut-off valve means are incorporated in said transfer conduit. The tongs are adapted to assume a condition in which said jaw means grip a workpiece and said shut-off valve means are open so that a pressure which depends on the weight of said workpiece and which exceeds said predetermined pressure is applied through said transfer conduit and said jaw-closing pressure chamber to said jaw-closing piston.

10 Claims, 4 Drawing Figures

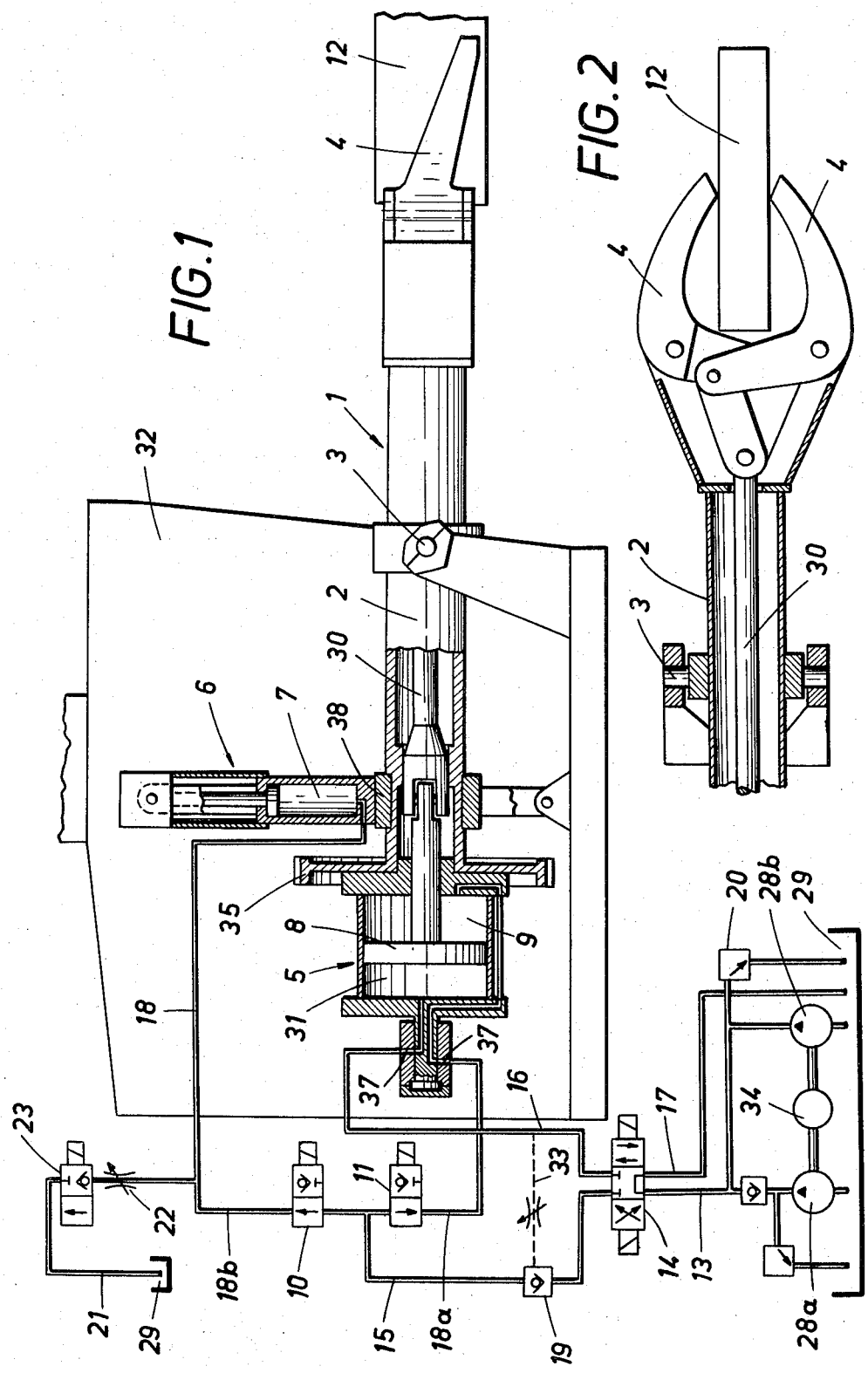

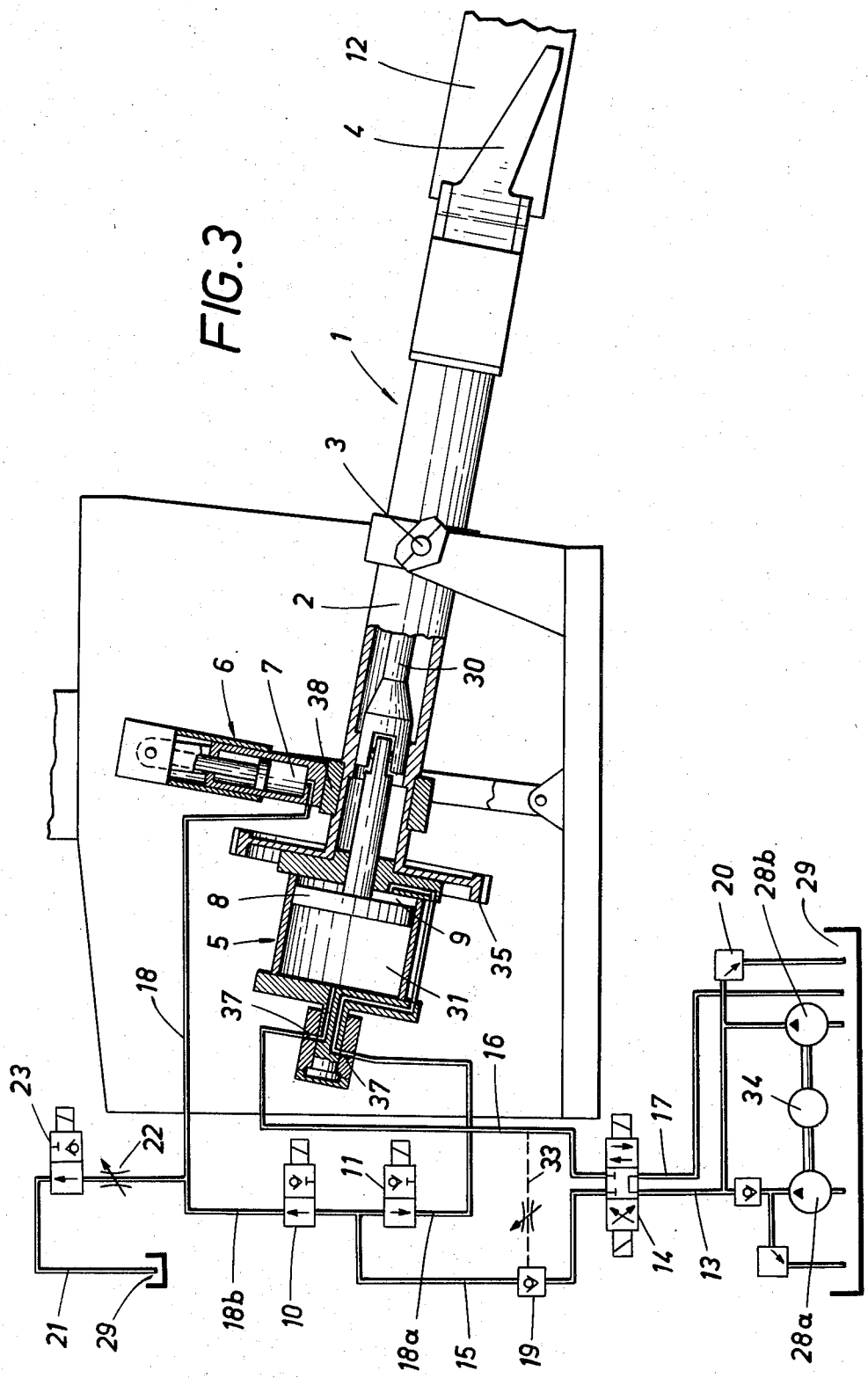

HYDRAULICALLY OPERABLE TONGS FOR CHARGING A WORKPIECE TO BE FORGED

This invention relates to hydraulically operated tongs for charging workpieces to be forged, which tongs comprises a jaw carrier which is tiltable on a horizontal pivot, a double-acting jaw moving actuator for operating the jaws, and a tilting actuator for controlling the angular position of the jaw carrier.

In known tongs of this kind for charging workpieces to be forged, the gripping pressure applied by the jaws can be controlled by a limitation of the hydraulic pressure which is applied to the jaw-moving actuator in the jaw-closing sense. A relief valve or the like is used in most cases for this purpose. These known tongs have the disadvantage that the gripping pressure remains constant once it has been adjusted so that the jaws always grip each workpiece to be forged or other item with the same force, regardless of its bulk and weight. It will be understood that this gripping force is too strong for some workpieces and too weak for others so that some workpieces will be deformed whereas others will not be reliably gripped or may even slip.

It is an object of the invention to eliminate these disadvantages and to provide tongs of the kind described first hereinbefore which serve to charge workpieces to be forged and have jaws which are capable of exerting a gripping force which is automatically controlled in dependence on the weight of the workpiece to be forged or other item being gripped in such a manner that they can reliably grip all workpieces without risk of damage thereto.

This object is accomplished according to the invention essentially in that the cylinder chamber of the tilting actuator is hydraulically connected by shut-off valves to that cylinder chamber of the jaw-moving actuator from which pressure is applied to the jaw-moving piston in the jaw-closing sense so that when a workpiece is gripped and carried by the tongs, a pressure which depends on the weight of the workpiece and which exceeds the set jaw-closing pressure is applied from the tilting actuator to the jaw-moving piston in the jaw-closing sense. When the workpiece is gripped with the set gripping force and has been raised from its support, the workpiece tends to exert on the jaw carrier a tilting torque which depends on the weight of the workpiece and which results in a pressure rise in the tilting actuator. This increased pressure exceeds the normal jaw-closing and is transmitted through the transfer conduit to the jaw-moving actuator and is applied to the jaw-moving piston in the jaw-closing sense. It will be understood that the force which is due to the higher pressure applied to the piston is exerted on the jaws so that the force with which the latter grip the workpiece is increased by an amount which depends on the weight of the workpiece. Thus, the communication between the tilting and jaw-moving actuators permits of an adjustment of the effective gripping force in dependence on the weight of the workpiece being gripped. For this reason, the shut-off valves in the transfer conduit are required to enable a movement of the two actuators independently of each other.

It will be particularly desirable to provide for the jaw carrier a pivotal axis which is disposed adjacent to the center of gravity of the assembly comprising said jaw carrier and the jaws and preferably so that the jaw portion of said assembly has a slight overbalance. In this case, a single pivot for the jaw carrier will be sufficient and when the workpiece has been raised the tilting actuator can transform virtually the entire weight of the workpiece into hydraulic pressure so that the jaw-closing pressure can be adjusted in direct and close dependence on the weight of the workpiece. In such an arrangement, the tilting actuator acts on the jaw carrier approximately normal thereto, and it will be sufficient if the tilting actuator counterbalances the jaw carrier whereas the tilting actuator is almost relieved when the tongs are out of operation.

The shut-off valves open the transfer conduit between the tilting and jaw-moving actuators only when the workpiece has been raised. Only in this case can the weight of the workpiece act to increase the pressure in the jaw-closing actuator so that it will be sufficient if the transfer conduit is open during this phase of the operation of the charging tongs. The jaw-moving and opening of the jaws is initiated by the closing actuator alone. For this purpose, the communication to the tilting actuator must be shut off.

In a particularly desirable embodiment of the invention, a multiple-way control valve is connected to the common pump discharge conduit serving to supply the tilting and jaw-moving actuators, and a jaw-closing conduit for applying to the jaw-moving actuator a pressure in a jaw-closing sense, a jaw-moving conduit for applying to the jaw-closing actuator a pressure in a jaw-opening sense, and a main return conduit extend from said control valve, which in a jaw-closing position connects the discharge conduit to the jaw-closing conduit and the jaw-opening conduit to the return conduit, and in a jaw-opening position connects the discharge conduit to the jaw-opening conduit and the jaw-closing conduit to the return conduit, and in a neutral position directly connects the discharge conduit to the return conduit. When it is desired to close the jaws, the multiple-way valve is moved to its jaw-closing position, in which the jaw-closing conduit is connected to the discharge conduit so that a pressure is applied to the closing actuator in a jaw-closing sense. To enable any movement of the jaw-moving actuator in this case, the jaw-opening conduit must be connected to the return conduit because the jaw-moving actuator is double-acting and the hydraulic fluid must be displaced from that cylinder chamber of the jaw-moving actuator from which pressure is applied to the jaw-moving piston in the opening sense. When it is desired to open the jaws, the connections between the conduits must be interchanged. For this purpose, the control valve is moved to its jaw-opening position. In the neutral position, the jaw-closing and jaw-opening conduits are shut off so that the jaws remain either open or engaged since the shut-off conduits prevent a movement of the jaws. When the transfer conduit between the tilting and jaw-moving actuators is open, however, the gripping pressure applied by the jaws is adjusted in dependence on the weight of a workpiece which is gripped and carried.

The jaw-closing conduit opens desirably into the transfer conduit connecting the tilting and jaw-moving actuators, and the shut-off valves are adapted to block the two sections of the transfer conduit which lead from the junction with the closing conduit to the two actuators. In such an arrangement, the jaw-closing conduit may be used to apply pressure to each or both of the tilting and jaw-moving actuators. For this reason, pumps having different dimensions may be used to operate both actuators. This is economically desirable because relatively high pressures and low liquid flow rates are required for the tilting actuator and lower pressures and relatively high flow rates are required for the jaw-moving actuator. In such an arrangement, a direct communication between the two actuators will be provided through the open shut-off valves even when the jaw-closing conduit is shut off.

Further in accordance with the invention, the discharge conduit incorporates a pressure-limiting valve, which initiates a movement of the multiple-way valve to its neutral position when an adjustable pressure has been reached. During the closing of the jaws, the multiple-way valve remains in its jaw-closing position until the pressure has risen to the preset value which is required for a frictional connection between the jaws and the workpiece. At that time, the supply of pressure fluid is interrupted and the tongs grip the workpiece with a gripping force which remains constant until the workpiece has been raised from its support. Thereafter the gripping force is adjusted in dependence on the weight of the workpiece.

To enable a tilting of the jaw carrier, the invention provides an additional return conduit which is connected to the transfer conduit connecting the tilting and closing actuators and which incorporates a throttle valve and a shut-off valve. When it is desired to tilt down the jaw carrier, it will be sufficient to open the shut-off valve so that hydraulic fluid can be displaced from the tilting actuator in dependence on the tilting movement of the jaw carrier. To prevent in this case in the tilting and jaw-closing actuators a pressure drop, which would tend to reduce the gripping pressure applied by the jaws, the shut-off valve is preceded by a throttle valve. As a result, the charging tongs can tilt down the workpiece while gripping the same with a constant gripping force without need to interrupt the connection between the tilting and jaw-closing actuators.

According to the invention, the jaw-closing conduit incorporates a check valve, which automatically opens in response to a rise of the pressure in the jaw-opening conduit to a predetermined value. As the jaws open, a pressure is built up in the corresponding cylinder chamber of the jaw-moving actuator and in the jaw-opening conduit and this pressure rises until the check valve opens so that the jaw-closing conduit is no longer shut off and can no longer block a movement of the jaw-moving piston in the jaw-opening sense. This check valve is mainly required to reliably prevent a pressure drop in the jaw-moving actuator and thus to avoid a decrease of the gripping force exerted by the jaws when a jaw-closing pressure is applied to the jaw-moving actuator so that the jaws grip a workpiece.

In a further embodiment of the invention, mechanical limit switches are provided, which initiate a movement of the multiple-way valve from its neutral position to its jaw-closing position in response to an uncontrolled tilting of the jaw carrier from its horizontal or inclined position and which initiate a movement of the multiple-way valve back to its neutral position when the jaw carrier has returned to its predetermined position. Such an uncontrolled tilting may be caused by leakage losses which cause a movement of the tilting piston. Such an uncontrolled tilting results in an operation of a limit switch, which controls the control valve so that the jaw-closing conduit and the tilting actuator are connected to the discharge conduit and the jaw carrier is forced back to its original position. As soon as it has reached said position, a second limit switch responds to initiate a movement of the multiple-way valve back to its neutral position. A total of four limit switches are provided to ensure these operations in response to a tilting of the jaw carrier from the horizontal position and from an inclined position as a result of leakage losses.

It will be particularly desirable if the limit switches which are responsive to a tilting of the jaw carrier from its horizontal position are rendered inoperative only when the shut-off valve in the additional return conduit is closed. This arrangement enables an intended tilting without an automatic response of the limit switches and without need for an arbitrary disconnection of the limit switches. The switches associated with the inclined position remain always operative and constitute additional tilt-limiting means.

The invention is illustrated by way of example in the drawing, in which

FIG. 1 is a side elevation, partly in section, showing charging tongs according to the invention, FIG. 2 is a top plan view showing the jaws of the tongs of FIG. 1, FIG. 3 shows tongs for charging workpieces to be forged in a tilted position, and FIG. 4 is a transverse sectional view taken on the level of the tilting actuator and showing the jaw carrier.

The hydraulic tongs 1 for charging workpieces to be forged comprises a jaw carrier 2 pivoted on a horizontal pivot 3, which is disposed adjacent to the center of gravity of the assembly comprising the jaw carrier and the jaws, which will be subsequently described. Said assembly has preferably an overbalance at the end provided with the jaws. To operate the jaws 4, a double-acting jaw-moving actuator 5 is directly mounted on the jaw carrier 2. A tilting actuator 6 extends normal to and is connected to the jaw carrier 2 and controls the angular position of the jaw carrier. The cylinder chamber 7 of the tilting actuator 6 is hydraulically connected by a conduit which incorporates shut-off valves 10, 11 to that cylinder chamber 9 of the jaw-moving actuator 5 from which pressure is applied to the jaw-moving piston 8 in the jaw-closing sense. As a result, a pressure which is higher than the set jaw-closing pressure will be applied to the jaw-moving piston 8 when the jaws 4 have gripped and carry a workpiece 12 and said higher pressure will depend on the weight of said workpiece. The tilting actuator 6 and the jaw-moving actuator 5 are supplied by a common pump discharge conduit 13, which incorporates a multiple-way valve 14. A jaw-closing conduit 15 for applying pressure to the jaw-moving piston 8 in a sense to close the jaws 4, a jaw-moving conduit 16 for applying pressure to the jaw-moving piston in a jaw-opening sense, and a main return conduit 17 extend from the multiple-way valve 14. In its jaw-closing position, the valve 14 connects the discharge conduit 13 to the jaw-closing conduit 15 and connects the jaw-opening conduit 16 to the return conduit 17. In its jaw-opening position, the valve 14 connects the discharge conduit 13 to the jaw-opening conduit 16 and connects the jaw-closing conduit 15 to the return conduit 17. In its neutral position, shown in FIGS. 1 and 3, the valve 14 connects the discharge conduit 13 directly to the return conduit 17. The jaw-closing conduit 15 opens into the transfer conduit 18 at a junction disposed between the tilting actuator 6 and jaw-moving actuator 5. The transfer conduit 18 comprises two sections 18a and 18b, which extend from the junction of the jaw-closing conduit to the two actuators 6, 5 and which can be shut off individually or jointly by the shut-off valves 10, 11. The jaw-closing conduit 15 incorporates also a check valve 19, which automatically opens when the pressure in the jaw-opening conduit 16 has risen to a predetermined value. The pump discharge conduit 13 comprises a pressure-limiting valve 20 which causes the multiple-way valve 14 to move to its neutral position when the pressure has risen to a predetermined, adjustable value. To enable a tilting of the jaw carrier 2, an additional return conduit 21 extends from the section 18b of the transfer conduit 18 and incorporates a throttle valve 22 and a shut-off valve 23. In response to an uncontrolled tilting of the jaw carrier 2, mechanical limit switches 24, 25, 26, 27 are operated, which move the multiple-way valve 14 from its neutral position to its jaw-closing position and which cause the valve 14 to return to its neutral position when the jaw carrier has returned to its predetermined position. The switches 24, 25 initiate and terminate the movement of the valve 14 in response to a tilting of the jaw carrier 2 from the horizontal position and are inoperative when the shut-off valve 23 is open. The switches 26, 27 are always ready to operate and control the movement of the control valve in response to a tilting of the jaw carrier from its inclined position.

When the tongs 1 for charging workpieces to be forged are in position of rest, the jaw carrier 2 extends horizontally and the jaws 4 are open. In this condition, the pump 28a serving only to supply the jaw-moving actuator 5 and the pump 28b for supplying the tilting actuator 6 are either de-energized or discharge through a by-pass conduit directly into the pressure fluid tank 29 because the multiple-way valve 14 is in its neutral position. The pump 28a delivers pressure fluid at a high rate and under a relatively low hydraulic pressure. The pump 28b delivers pressure fluid at a low rate and under a higher hydraulic pressure. The two pumps are mounted on a common motor shaft and are driven by a single motor 34. The jaw-moving piston 8 of the jaw-moving actuator 5 has opened the jaws 4 by means of the actuating rod 30, and the tilting actuator 6 is shut off by the closed shut-off valves 10 and 23 from any pressure fluid supply and return conduit and holds the jaw carrier 2 in a horizontal orientation.

When it is desired to close the jaws 4 so that they grip a workpiece, the multiple-way valve 14 is moved to its jaw-closing position and the shut-off valve 11 opens that section 18a of the transfer conduit 18 which leads to the jaw-moving actuator 5. Pressure fluid can now flow through the discharge conduit 13, the jaw-closing conduit 15 and the section 18a into the cylinder chamber 9 of the jaw-moving actuator 5 and applies pressure to the jaw-moving piston in the jaw-closing sense. As a result, the piston 8 moves to the left and by means of the actuating rod 30 closes the jaws 4. In this operation, the gripping force exerted by the jaws rises until the pressure to which the pressure-limiting valve 20 has been set is exceeded so that the control valve 14 is returned to its neutral position. The pressure-limiting valve 20 must be set to a pressure which is sufficient to ensure the required frictional connection between the jaws 4 and the workpiece 12. It will be understood that during the jaw-closing movement of the piston 8, the jaw-opening conduit 16 is connected to the return conduit 17. This is provided for by the control valve 14 in its jaw-closing position. The jaw-moving piston can be moved because pressure fluid can be displaced from the cylinder chamber 31, from which pressure can be applied to the jaw-moving piston 8 in the jaw-opening sense.

In FIG. 1, the tongs 1 for charging workpieces to be forged are shown in their closed position. When the jaws 4 of the charging tongs have gripped a workpiece 12 and by means of a hoisting gear 32, which is only diagrammatically indicated in the drawing, the tongs 1 are raised so that the workpiece 12 no longer rests on a support, the shut-off valves 10, 11 are automatically opened to open the transfer conduit between the tilting actuator 6 and the jaw-moving actuator 5. The pressure conditions in the tilting actuator 7 are transmitted to the chamber 9 of the closing cylinder. Because the jaw carrier is pivoted, the weight of the workpiece 12 gripped by the tongs exerts a tilting torque which is proportional to the weight of the workpiece and which results in a pressure rise in the tilting actuator 7. This pressure rise is transferred through the transfer conduit 18 into the cylinder chamber 9 of the jaw-moving actuator 5 and, in addition to the jaw-closing pressure to which the pressure-limiting valve 20 is set, acts on the jaw-moving piston 8 in the jaw-closing sense. Hence, the gripping force exerted by the jaws is exactly adjusted in dependence on the weight of the workpiece being gripped and when the workpiece has been raised is directly dependent on its weight.

If any leakage losses occur in the tilting actuator 6 so that the workpiece to be forged is tilted down, the jaw carrier 2 will mechanically actuate the limit switch 24 so that the latter initiates a movement of the control valve 14 to its jaw-closing position. As a result, pressure fluid is pumped through the jaw-closing conduit 15 and that section 18b of the transfer conduit 18 which leads to the tilting actuator 6 into the latter and the jaw carrier is tilted back to its initial position. When the latter has been reached, the limit switch 25 is actuated to initiate a movement of the control valve back to its neutral position, in which the supply of pressure fluid is shut off. The limit switches 26, 27 have the same function as the switches 24, 25 but respond when the jaw carrier is initially in an inclined position whereas the switches 24, 25 respond when the jaw carrier is initially in a horizontal position.

When it is desired to lower and/or tilt down the jaw carrier 2 and the workpiece 12 gripped by the jaws 4 (FIG. 3), the shut-off valve 23 opens the return conduit 21 so that the limit switches 24, 25 are rendered inoperative. The throttle valve 22 which precedes the shut-off valve prevents a pressure drop in the tilting actuator 6 and, since the transfer conduit leading to the cylinder chamber 9 of the jaw-moving actuator is open, the gripping pressure applied by the jaws will not be reduced. The tongs can now be tilted as desired whereas the gripping pressure depending on the weight of the workpiece remains constant. When it is desired to raise the jaw carrier, the return conduit 21 is shut off, the control valve 14 is moved to its jaw-closing position and with, the shut-off valve 11 closed and the valve 10 open, pressure is applied to the tilting actuator 6 through the section 18b of the transfer conduit 18 and the closing conduit 15 until the desired elevation has been reached.

The tongs 1 for charging workpieces to be forged cannot only be tilted but can be rotated about their longitudinal axis. For this purpose, the jaw carrier is provided with a gear ring 35 in mesh with a pinion 36. It will be understood that the conduits 16, 18a leading to the jaw carrier have rotatable fittings 37 and the tilting actuator 6, which is anchored on the hoisting gear 32, is connected to the jaw carrier by a rotatable bearing ring 38.

When it is desired to deposit the workpiece in the furnace or in the forging press, the hoisting gear 32 is lowered until the workpiece 12 to be forged rests again on a support. As a result, the shut-off valve 10 is closed and the transfer conduit 18 between the tilting actuator 6 and the jaw-moving actuator 5 is interrupted so that the tilting actuator 6 remains in position and the jaw carrier must remain in position. The multiple-way valve 14 is moved to its jaw-opening position so that the jaw-opening conduit 16 is connected to the discharge conduit 13, the cylinder chamber 31 of the jaw-moving actuator 5 is filled with pressure fluid and pressure is applied to the jaw-moving piston 8 in a direction to open the jaws 4. In this case, the jaw-moving conduit 15 must be connected to the return conduit 17 so that the hydraulic fluid in the cylinder chamber 9 can be displaced. The check valve 19 incorporated in the jaw-closing conduit normally prevents a return flow of pressure fluid from the actuators so that the gripping force cannot be decreased and there will be no undesired pressure drop resulting in a tilting of the jaw carrier. This check valve must now be rendered inoperative. When the pressure in the jaw-opening conduit 16 now rises above a certain limit, it will act through a connecting conduit 33, indicated in dotted lines in the drawing, on the check valve 19 so that the latter opens the return conduit. The piston 8 can now move to the right and open the jaws 4.

What is claimed is:

1. Hydraulically operable tongs for charging a workpiece to be forged, which comprise a jaw carrier, a horizontal pivot to which said jaw carrier is pivoted, jaws mounted on said jaw carrier and adapted to be closed to grip a workpiece and adapted to be opened to release said workpiece, a double-acting hydraulic jaw-moving actuator which is connected to said jaws and comprises a cylinder and a jaw-moving piston which is movable in said cylinder and defines therein a jaw-closing pressure chamber for applying pressure to said piston in a jaw-closing sense, and a jaw-opening pressure chamber for applying pressure to said piston in a jaw-opening sense, controlled pressure-applying means for applying a predetermined pressure to said piston through said jaw-closing pressure chamber, a hydraulic tilting actuator which is connected to said jaw carrier and comprises a tilting cylinder and a tilting piston which is movable in said tilting cylinder and defines therein a tilting pressure chamber for applying a pressure in excess of said predetermined pressure to said tilting piston so as to control the angular position of said jaw carrier, a pressure transfer conduit which connects said tilting pressure chamber to said jaw-closing pressure chamber, shut-off valve means incorporated in said transfer conduit, and means for applying a pressure which depends on the weight of said workpiece and which exceeds said predetermined pressure through said transfer conduit and said jaw-closing pressure chamber to said jaw-moving piston whereby said jaws grip the workpiece while said shut-off valve means are open.

2. Tongs as set forth in claim 1, in which said jaw carrier and jaws constitute an assembly and said pivot is disposed near the center of gravity of said assembly.

3. Tongs as set forth in claim 2, in which said assembly has on one side of said pivot a portion comprising said jaws and said portion of said assembly has an overbalance.

4. Tongs as set forth in claim 1, in which said shut-off valve means are arranged to open said transfer conduit only when said jaw means have gripped a workpiece and said jaw carrier carries said workpiece.

5. Tongs as set forth in claim 1, which comprise a multiple-way control valve, a jaw-closing conduit connecting said control valve to said jaw-closing pressure chamber, a jaw-opening conduit connecting said control valve to said jaw-opening pressure chamber, a pump discharge conduit comprised in said controlled pressure-applying means and connected to said control valve, and a main return conduit connected to said control valve, said control valve being adapted to assume a jaw-closing position in which it connects said pump discharge conduit to said jaw-closing conduit and connects said jaw-opening conduit to said main return conduit, said control valve being adapted to assume a jaw-opening position in which it connects said pump discharge conduit to said jaw-opening conduit and connects said jaw-closing conduit to said main return conduit, and said control valve being adapted to assume a neutral position in which it connects said discharge conduit directly to said main return conduit and in which it shuts off said jaw-closing conduit and said jaw-opening conduit.

6. Tongs as set forth in claim 5, in which said transfer conduit comprises a first section connecting said jaw-closing conduit to said tilting pressure chamber and a second section connecting said jaw-closing conduit to said jaw-closing chamber and said shut-off valve means comprise a first shut-off valve incorporated in said first section and a second shut-off valve incorporated in said second section.

7. Tongs as set forth in claim 5, in which said controlled pressure-applying means comprise a pressure-limiting valve which is associated with said pump discharge conduit and set to operate in response to said predetermined pressure in said jaw-closing chamber, and said control valve is arranged to assume said neutral position in response to the operation of said pressure-limiting valve.

8. Tongs as set forth in claim 5, which comprise an additional return line, which incorporates a throttle valve and in which a shut-off valve is connected to said transfer conduit and enables a displacement of fluid from said tilting pressure chamber so as to permit said jaw carrier to tilt about said pivot in a sense to lower said jaws under the action of the weight of a workpiece gripped by said jaws.

9. Tongs as set forth in claim 5, in which said jaw-closing conduit incorporates a check valve which is arranged to open automatically in response to a rise in pressure in said jaw-opening conduit above a predetermined value.

10. Tongs as set forth in claim 5, in which
said tilting actuator is adapted to hold said jaw carrier in a horizontal position and in a predetermined downwardly inclined position in dependence on the pressure in said tilting pressure chamber,
first mechanical limit switch means are provided which are arranged in response to an uncontrolled tilting of said jaw carrier from said horizontal position to initiate a movement of said control valve from said neutral position to said jaw-closing position so as to induce a tilting back of said jaw carrier to said horizontal position, and in response to the arrival of said jaw carrier in said horizontal position after said tilting back to initiate a movement of said control valve from said jaw-closing position to said neutral position, and
second mechanical limit switch means are provided which are arranged in response to an uncontrolled tilting of said jaw carrier from said predetermined downwardly inclined position to initiate a movement of said control valve from said neutral position to said jaw-closing position so as to induce a tilting back of said jaw carrier to said predetermined, downwardly inclined position, and in response to the arrival of said jaw carrier in said predetermined, downwardly inclined position after said tilting back to initiate a movement of said control valve from said jaw-closing position to said neutral position.

* * * * *